ERSKINE P. GARRISON
JOHN E. TSCHIRKY
INVENTORS.

ERSKINE P. GARRISON
JOHN E. TSCHIRKY
INVENTORS.

United States Patent Office 3,516,718
Patented June 23, 1970

3,516,718
LOWER THRUST EQUALIZER FOR DRILLING TOOLS
Erskine P. Garrison, Long Beach, and John E. Tschirky, Manhattan Beach, Calif., assignors to Smith Industries International, Inc., Whittier, Calif., a corporation of California
Filed Oct. 12, 1967, Ser. No. 674,868
Int. Cl. F16c *19/30*
U.S. Cl. 308—230    1 Claim

ABSTRACT OF THE DISCLOSURE

A thrust equalizer for transmitting thrust from a drill string downwardly through superimposed thrust bearings to a drill drive shaft including a series of toggle-like elements disposed beneath a downward thrust transmitting shoulder in a down hole drill spring pipe section, the toggle levers each being positioned to transmit thrust equally upon the two thrust bearings, a race of each thrust bearing being arranged for rotation with the drill string pipe section, and the other race of each pair being arranged for rotation with the drill shaft; at least one race of each thrust bearing being movable away from and toward the other race.

---

This invention relates to a thrust equalizer for drilling tools.

More specifically, the invention contemplates the provision of a pair of thrust bearings in downward thrust relationship between the lower drill string pipe section and the drill shaft, the dual thrust bearing providing increased friction characteristics, together with means for equally distributing the thrust between the two bearings and independently transmitting it to the drive shaft, regardless of relative axial movement between the drive shaft and the drill string pipe section, and also regardless of axial alignment or misalignment of the drive shaft and drill string pipe section, either continuously or intermittently.

The invention also includes means for permitting a bearing race of each bearing assembly to move axially away from and toward its complementary race, and means for causing one race of each bearing to rotate with the drive shaft and relative to the other race of each bearing.

The invention contemplates the use of at least two superimposed ball bearing assemblies compactly situated between the drill string pipe section and the drive shaft to greatly increase the effective bearing surface within the space limits dictated by the drill string pipe section and the drive shaft, and to provide the rotation of one race relative to its complement, as well as axial movement of one relative to the other for more equal distribution of wear, and to insure adequate lubrication by the drilling mud.

The above and other objects will more fully appear from the following description in connection with the accompanying drawings.

Figure 1:
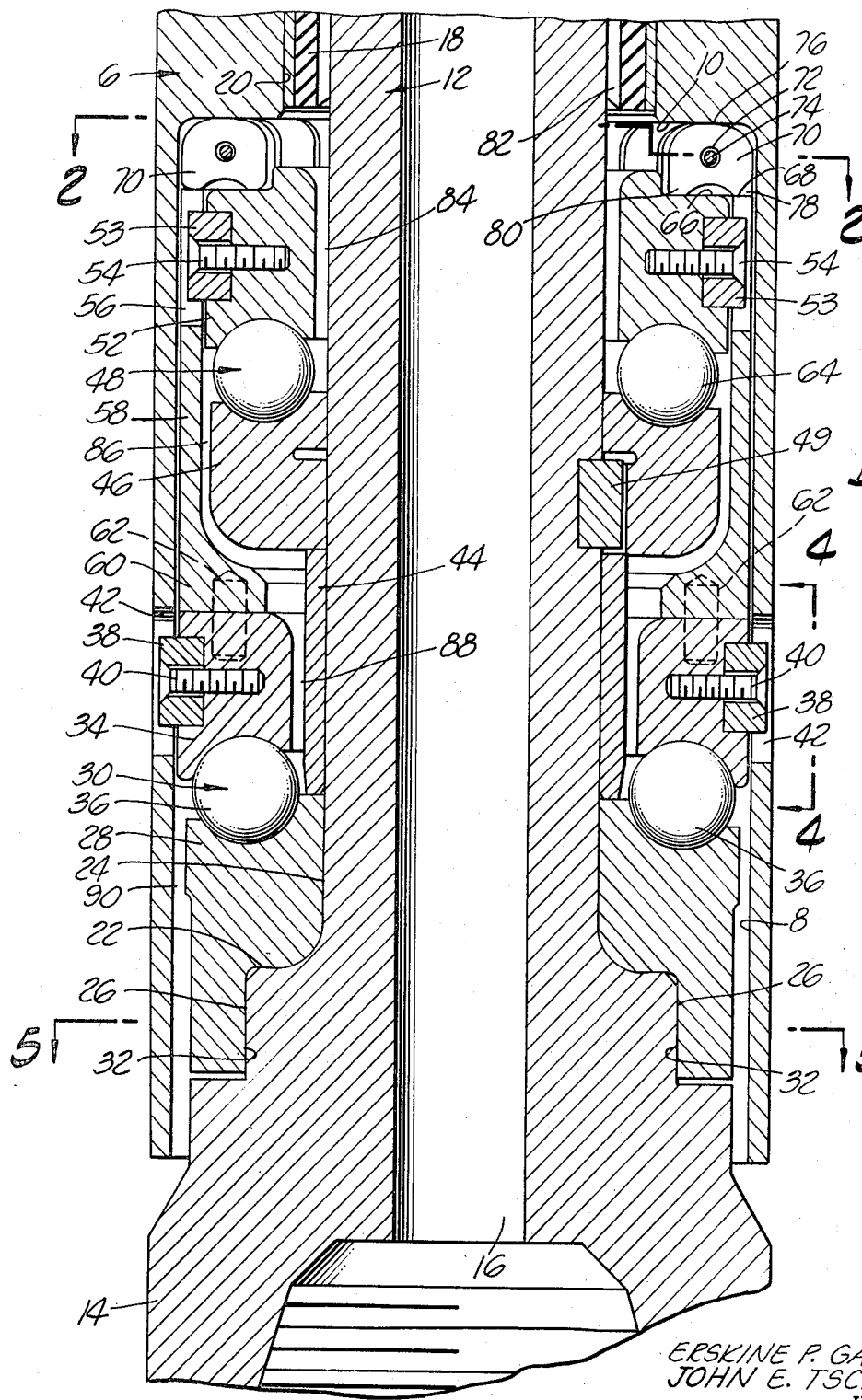
FIG. 1 is a vertical sectional view through the lower portion of a down hole drill string pipe section and part of a drill drive shaft with an embodiment of the invention incorporated therewith.
Figure 2:
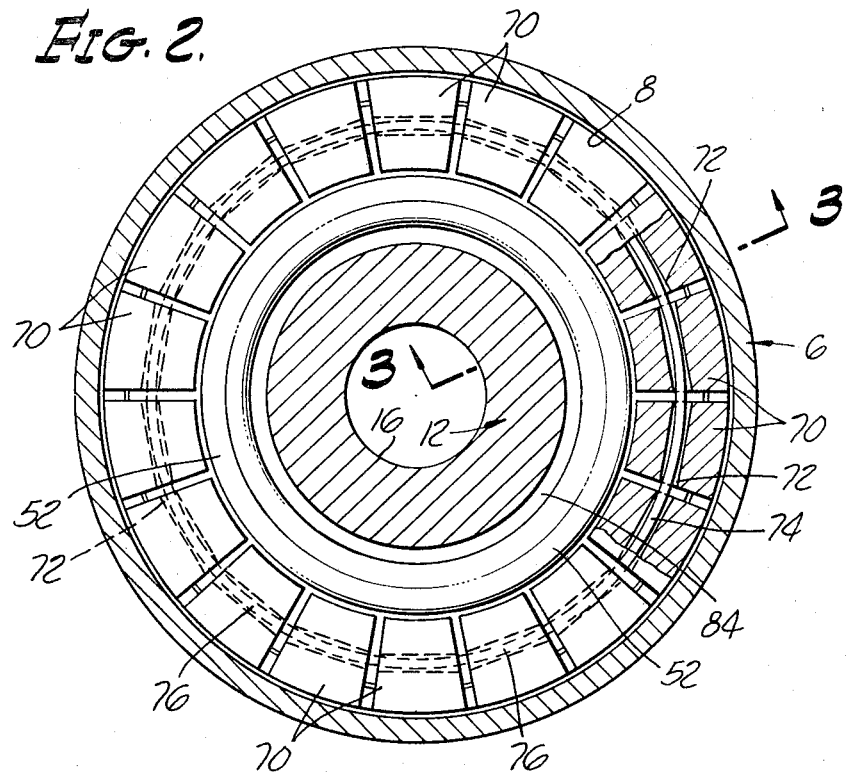
FIG. 2 is a transverse sectional view taken approximately on the line 2—2 of FIG. 1.
Figure 5:
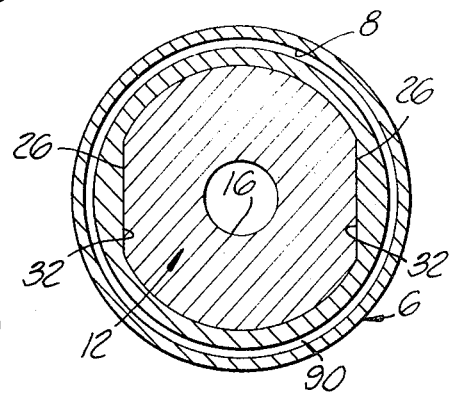
FIG. 5 is a transverse sectional view, on a reduced scale taken approximately on the line 5—5 of FIG. 1.
Figure 3:
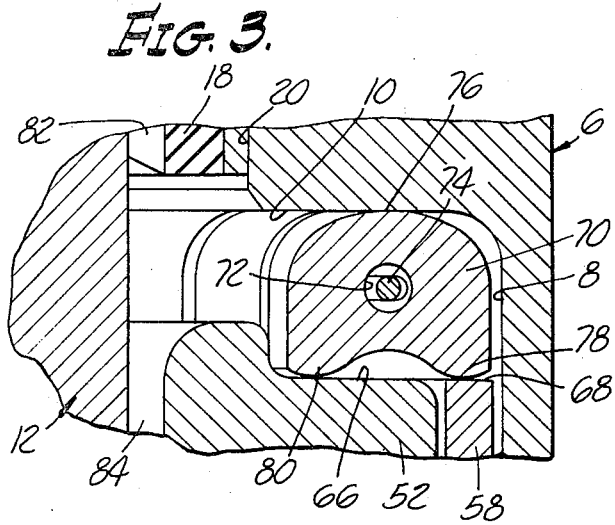
FIG. 3 is an enlarged sectional detail taken approximately on the line 3—3 of FIG. 2.
Figure 4:
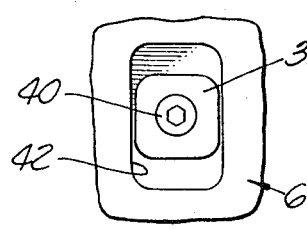
FIG. 4 is a fregmentary elevational view taken approximately on the line 4—4 of FIG. 1.

There is illustrated a drill string pipe section 6 which is the down hole or lowermost section of conventional drill pipe. It is provided with an enlarged inner diameter 8 which defines a downwardly facing shoulder or thrust face 10. In the lower drill string pipe section 6 is a drill bit drive shaft 12 having a bit sub 14 on the lower end as is customary. The drive shaft 12 may be rotated by any suitable means such as a Moineau pump driven by pressurized drilling mud flowing downwardly through the drill string. The drive shaft 12 is provided with an axial bore 16 to furnish drilling mud to the drill bit and its cutters. The upper portion of the drive shaft 12 is shown with the lower portion of a radial bearing 18 which is interposed between the drive shaft and the smaller diameter 20 of the drill string pipe section 6.

The upper portion of the bit sub 14 or the lower portion of the drive shaft 12 is provided with an upwardly facing thrust shoulder 22 which may, as illustrated, merge with the principal drive shaft outer diameter 24 on a radius. Just below the shoulder 22, the drive shaft is enlarged and provided with parallel flats 26.

Resting upon the upwardly facing thrust shoulder 22 is a lower bearing race 28 of a lower thrust bearing assembly 30. The race 28 preferably snugly fits the principal outer diameter 24 of the drill shaft 12 and therebelow it is formed on a radius and then flattened outwardly to conform to said upwardly facing thrust surface 22 on the drive shaft. Below this point, the race 28 has an internal shape including flats 32 which are parallel to and lie closely against the flats 26 on the drill shaft. In this manner, the lower race 28 will rotate with the drill shaft 12.

Above the lower race 28 is an upper race 34 for the lower bearing assembly 30. The lower and upper races 28 and 34 are provided with facing annular grooves in which are retained bearing balls 36. The upper race 34 is provided with a lug 38 held by a bolt 40 threaded into the race 34. The lug 40 lies in a vertically elongated slot 42 formed in the wall of the drill string pipe section 6. As shown in FIG. 1, two such lugs 38 are provided. They may be in such number as desired, the object being to hold the race 34 in a stationary position along with the drill string pipe section 6, while the lower race 28 rotates with the drive shaft 12, thereby providing for uniform wear distribution on the balls and races, and preventing both races from rotating with the drive shaft 12.

Lying about and on a longitudinal intermediate portion of the drive shaft 12 is a thrust sleeve 44. Its lower edge rests upon the lower race 28 and upon its upper edge rests a lower race 46 or an upper thrust bearing assembly 48. The race 46 is connected to the drive shaft 12 for rotation therewith by one or more keys 49.

Above the race 46 is an upper race 52 for the upper bearing assembly 48. It is provided with lugs 53 secured to the race by bolts 54, such lugs extending into vertically elongated slots 56 in a thrust transmitting collar 58. The base 60 of said collar rests upon the upper race 34 of the lower thrust bearing assembly and is connected to said race by pins 62 so that the thrust collar 58 and upper race 52 of said upper bearing assembly will be held stationary against rotation by the lower drill string pipe section 6.

Of course, between the races 46 and 52 of the upper thrust bearing assembly are bearing balls 64 retained between them in the same manner as the balls 36 in the lower bearing assembly.

Located between the downwardly disposed thrust surface 10 of the drill string pipe section 6, and upwardly disposed surface 66 of the upper race 52 and also the upper edge 68 of the thrust collar 58 is an annular assembly of toggle-like thrust equalizing elements 70. Each of these elements is apertured as at 72 to receive an annular ring 74 for loosely maintaining the thrust equalizing elements in their annular arrangement. Each thrust equalizing element 70 has an upper thrust receiving surface 76 and a pair of downwardly disposed thrust transmitting lobes 78 and 80. The lobes 78 rest upon the upper end of the thrust transmitting collar 58, and the lobes 80 rest upon the upwardly disposed thrust receiving surface 66 of the upper race 52.

The load or trust imparted by the drill string pipe of which section 6 is the lowermost, is transmitted by the downwardly facing thrust surface 10 of said pipe section to the thrust receiving portions 76 of the thrust equalizing elements 70. The lobes 78 and 80 on the thrust equalizing elements 70 are so positioned relative to the thrust receiving portions 76 of said elements that downward thrust is distributed equally to the upper race 52 of the upper bearing assembly 48 and to the thrust collar 58. Thrust imposed upon the upper race 52 is transmitted through the upper bearing balls 64, bearing race 46, thrust sleeve 44 and bearing race 28 to the thrust-receiving surface 22 of the drive shaft 12. Thrust in an equal amount which is transmitted to the thrust collar 58 is carried downwardly through the bearing race 34 and lower bearing balls 36 to the lower race 28, and thence to the drive shaft thrust-receiving surface 22. As a result, even though there is some vertical or axial movement of the drill shaft 12 relative to the drill string pipe section 6, and even though the drive shaft and pipe section may at times be out of axial alignment, the thrust equalizing elements 70 will tilt to compensate for such movement and the resulting relative axial movement between the upper race 52 and the thrust collar 58, and at all times equal amounts of thrust will be borne by the two bearing assemblies 30 and 48.

The structure is such that by equalizing the thrust between the two bearing assemblies, neither will receive an excessive thrust imbalance, and there will be uniform wear of the two bearing assemblies. By providing two bearing assemblies between the drive shaft and the drill pipe section, bearing life is greatly increased, and the equalization of the thrust to the two insures maximum life for the bearings.

The radial bearing 18 about the upper portion of the drive shaft 12 is provided with vertical grooves 82 to provide a supply of drilling mud under pressure to and through the bearings. The upper race 52 of the upper bearing assembly is spaced from the drive shaft to provide a drilling mud passage 84, the lower race 46 of said upper assembly is spaced inwardly from the thrust collar 58 to provide a mud passage 86. The upper race 34 of the lower bearing assembly is spaced outwardly from the thrust sleeve 44 to provide a mud passage 88, and the lower race 28 of the lower bearing assembly is spaced inwardly from the lower drill string pipe section 6 to provide a mud passage 90. These passages for the flow of drilling mud to and through the bearing assemblies, together with the ability of the upper races 34 and 52 to move axially away from and toward their respective lower races 28 and 46 provides space for an adequate pressurized supply of mud to and through the bearing assemblies, resulting in highly efficient lubrication and cooling of the bearings.

It will be, of course, understood that various changes can be made in the form, details, arrangement and proportions of the various parts without departing from the spirit of the invention.

We claim:

1. A thrust equalizer for use in a drill string comprising a drill string pipe section and a drill shaft having a drill bit connector, wherein the improvement comprises: bearing units comprising upper and lower thrust bearings made up of elements superimposed longitudinally of the drill shaft and in downward thrust association with said drill shaft, thrust equalizing means for downward thrust association with said upper and lower thrust bearings, said drill string pipe section being in downward thrust association with said equalizing means, said equalizing means being shiftable to distribute equal amounts of thrust from said drill string pipe section to each of said thrust bearing, and at least one bearing unit having a pair of races, one of which is axially movable relative to the other, and a radial bearing in said lower drill pipe section and about said drill bit shaft, said radial bearing having drilling mud passage means for conducting drilling mud downwardly to and through said bearing unit.

References Cited

UNITED STATES PATENTS

| | | | |
|---|---|---|---|
| 1,424,640 | 8/1922 | Hall | 308—230 |
| 2,301,105 | 11/1942 | Yost | 308—230 |
| 3,326,612 | 6/1967 | Schaefer | 308—160 |
| 2,630,354 | 3/1953 | Busks | 308—230 |
| 3,449,030 | 6/1969 | Tiraspolsky | 308—230 |
| 1,871,630 | 8/1932 | Minor et al. | 308—227 |

FOREIGN PATENTS

| | | |
|---|---|---|
| 1,061,576 | 6/1959 | Germany. |
| 1,170,717 | 5/1964 | Germany. |

MARTIN P. SCHWADRON, Primary Examiner

F. SUSKO, Assistant Examiner

Dedication 3,516,718.—*Erskine P. Garrison*, Long Beach and *John E. Tschirky*, Manhattan Beach, Calif. LOWER THRUST EQUALIZER FOR DRILLING TOOLS. Patent dated June 23, 1970. Dedication filed Aug. 25, 1980, by the assignee, *Smith International, Inc.*

Hereby dedicates to the Public the entire remaining term of said patent.
[*Official Gazette September 28, 1982.*]